United States Patent
Tsuchinaga et al.

(10) Patent No.: US 7,486,460 B2
(45) Date of Patent: Feb. 3, 2009

(54) DISK DRIVE WITH ENHANCED STORAGE CAPACITY INCREASE RATIO

(75) Inventors: Hiroyuki Tsuchinaga, Tokyo (JP); Naoki Satoh, Kanagawa (JP); Terumi Takashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 276 days.

(21) Appl. No.: 11/404,156

(22) Filed: Apr. 13, 2006

(65) Prior Publication Data
US 2006/0232874 A1 Oct. 19, 2006

(30) Foreign Application Priority Data
Apr. 13, 2005 (JP) ............... 2005-115681

(51) Int. Cl.
*G11B 20/12* (2006.01)

(52) U.S. Cl. ............... 360/48; 360/75; 711/112

(58) Field of Classification Search ............... None
See application file for complete search history.

(56) References Cited

U.S. PATENT DOCUMENTS

| 6,185,063 | B1 * | 2/2001 | Cameron | 360/75 |
| 6,967,810 | B2 * | 11/2005 | Kasiraj et al. | 360/78.04 |
| 7,082,007 | B2 * | 7/2006 | Liu et al. | 360/78.04 |
| 7,133,241 | B2 * | 11/2006 | Che et al. | 360/75 |
| 2005/0069298 | A1 * | 3/2005 | Kasiraj et al. | 386/125 |
| 2005/0071537 | A1 * | 3/2005 | New et al. | 711/100 |

FOREIGN PATENT DOCUMENTS

JP 2001-126202 5/2001

* cited by examiner

*Primary Examiner*—Hoa T Nguyen
*Assistant Examiner*—James L Habermehl
(74) *Attorney, Agent, or Firm*—Townsend and Townsend and Crew LLP; John Henkhaus

(57) ABSTRACT

Embodiments of the invention provide a disk drive that is capable of enhancing the storage capacity increase ratio while reducing the processing load for read/write operations. In one embodiment, a disk drive comprises a recording medium and a control section. The recording medium includes concentric or spiral data tracks. Each of the data tracks is provided with a plurality of circumferentially arranged sectors. The control section receives instructions for writing into a plurality of sectors, rearranges the data to be written into each sector into groups of N pieces of write data, and writes the data into N data tracks.

16 Claims, 5 Drawing Sheets

Fig. 5
| 1 | 3 | 5 | 7 | 9 | 11 | 13 | 15 |
|---|---|---|---|---|----|----|----|
| 2 | 4 | 6 | 8 | 10 | 12 | 14 | 16 |
Fig. 6
Step 1:
| 1 | 3 | 5 | 7 | 9 | 11 | 13 | 15 |
|---|---|---|---|---|----|----|----|
|   |   |   |   | 10 | 12 | 14 | 16 |
Step 2:
| 1 | 3 | 5 | 7 | 9 | 11 | 13 | 15 |
|---|---|---|---|---|----|----|----|
| 2 | 4 | 6 | 8 | 10 | 12 | 14 | 16 |
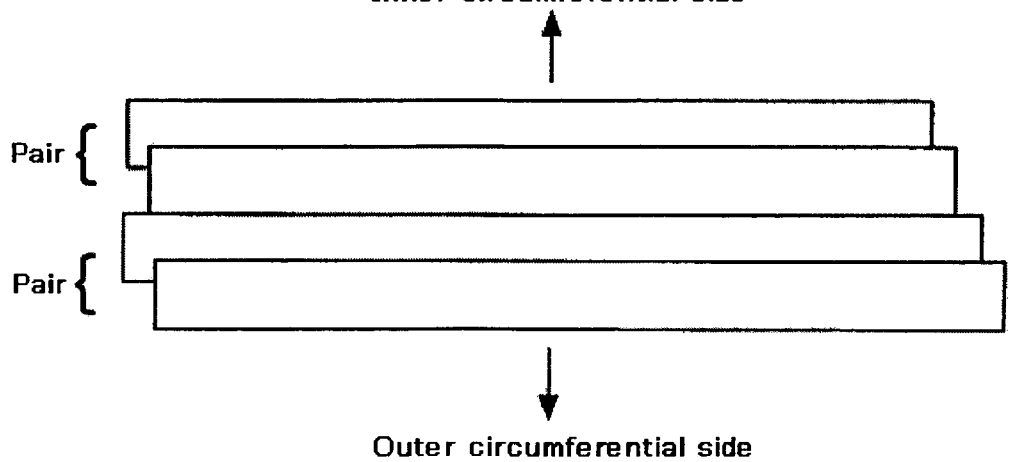
Fig. 7

DISK DRIVE WITH ENHANCED STORAGE CAPACITY INCREASE RATIO

CROSS-REFERENCES TO RELATED APPLICATIONS

This application claims priority from Japanese Patent Application No. JP2005-115681, filed Apr. 13, 2005, the entire disclosure of which is incorporated herein by reference.

BACKGROUND OF THE INVENTION

The present invention relates to a hard disk drive or other disk drive containing a disc-shaped recording medium.

In recent years, hard disk drives have been incorporated in various apparatuses. Hard disk drives are mounted, for instance, in a mobile music player and car navigation system. Under these circumstances, a shingle write method is used as a technology for increasing the information recording capacity while reducing the hard disk drive size. In the shingle write method, data tracks are recorded in a shingling manner, for instance, from the inner circumferential end of a recording medium to the outer circumferential end while performing a partial overwrite with a neighboring data track. This ensures that the widths of the resultant data tracks are smaller than the actual write widths of a magnetic head.

However, when the above method is used to write data on the k-th data track from the innermost circular end, it is necessary to rewrite the k-th to outermost data tracks. Under these circumstances, a technology for reducing the rewrite overhead is disclosed by Patent Document 1 (U.S. Pat. No. 6,185,063).

The technology disclosed by Patent Document 1 arranges the data tracks into groups of two as shown in FIG. 7 and uses such data track groups to perform a shingle write. This technology records the inner data track, which is contained in a group of two data tracks, and then records the outer data track. The outer data track is not partly overwritten but is used as a data track having the magnetic head write width.

When the above method is used in a situation where an odd-numbered data track and even-numbered data track differ in the read position, the read position can be set while avoiding a data track pair overwrite portion (overlap) (see FIG. 10 in Patent Document 1 ). Therefore, the data can be rewritten with relative flexibility.

BRIEF SUMMARY OF THE INVENTION

When the above conventional method for writing a pair of data tracks is used, the write width of a data track written later is equivalent to the write width of the magnetic head. Therefore, the storage capacity increase ratio cannot be enhanced without a loss. If, on the other hand, an increased number of data tracks are contained in a data track group, the storage capacity increase ratio can be enhanced, but the control scheme for using different read positions becomes complicated. As a result, the processing load for read/write operations increases.

The present invention has been made in view of the above circumstances and provides a disk drive that is capable of enhancing the storage capacity increase ratio while reducing the processing load for read/write operations.

In solving the above conventional problem, there is provided a disk drive comprising a recording medium that includes concentric or spiral data tracks, which are partly overwritten by an inner or outer neighboring data track, each of the data tracks being provided with a plurality of circumferentially arranged sectors; and a control section, which, upon receipt of instructions for writing into a plurality of sectors, rearranges the data to be written into each sector into groups of N pieces of write data as specified, and writes the data into N data tracks.

BRIEF DESCRIPTION OF THE DRAWINGS

FIG. 5 illustrates a typical sector layout that is provided by a disk drive according to one embodiment of the present invention.

FIG. 6 illustrates a typical method for writing data into sectors within a disk drive according to one embodiment of the present invention.

FIG. 7 illustrates an example of a conventional shingle write method.

DETAILED DESCRIPTION OF THE INVENTION

Figure 1:
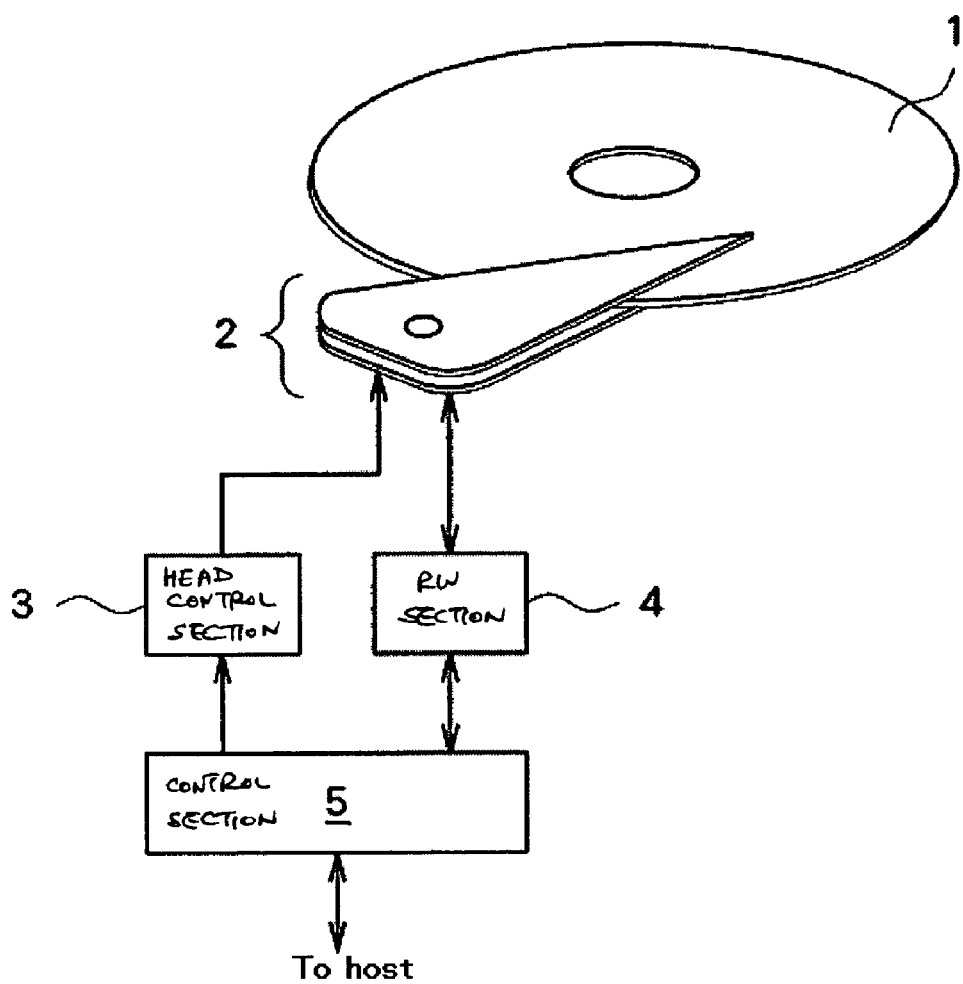
FIG. 1 is a schematic diagram illustrating a disk drive according to one embodiment of the present invention.

Embodiments of the present invention will now be described with reference to the accompanying drawings. As shown in FIG. 1, a disk drive according to one embodiment of the present invention includes a recording medium 1, a head assembly 2, a head control section 3, a read/write (RW) section 4, and a control section 5. FIG. 1 is a schematic diagram illustrating the disk drive.

The head assembly 2 includes a magnetic head, and magnetically records information on the recording medium 1 while relatively moving over a surface of the recording medium 1. It also reads a magnetic pattern recording on the recording medium 1 to reproduce recorded information.

The head control section 3 controls the position of the head assembly 2 and moves the magnetic head over the recording medium 1.

The RW section 4 receives a signal input from the control section 5, encodes the received signal, and outputs the resulting encoded information to the magnetic head of the head assembly 2 as an electrical signal. Further, the RW section 4 decodes recorded information in accordance with an electrical signal input from the magnetic head, and outputs the resulting decoded information to the control section 5.

For example, a microprocessor is employed as the control section 5. It operates in accordance with a program that is stored in a storage device (not shown). The control section 5 receives an information input, which is to be recorded, from a computer that serves as a host for the disk drive, and outputs the information to the RW section 4. Further, the control section 5 instructs the head control section 3 to move the magnetic head to a recording position on the recording medium 1 for recording the information.

Upon receipt of instructions for reading information recorded on the recording medium 1 from the computer that serves as the host, the control section 5 instructs the head control section 3 to move the magnetic head to the information recording position specified by the instructions. Subsequently, the control section 5 receives a decoded signal output from the RW section 4 and outputs the received signal to the computer.

In the present embodiment, the control section 5 performs a shingle write. Processing operations performed by the control section 5 will be described later in detail.

The disk drive is connected to the computer that serves as the host. Upon receipt of information write instructions from the computer, the control section 5 outputs the information to be recorded to the RW section 4 in compliance with the instructions. The RW section 4 encodes the information, generates an electrical signal, and outputs the generated electrical signal. The magnetic head of the head assembly 2 converts the electrical signal to a magnetic signal, and magnetizes the recording medium 1 to record the information.

Upon receipt of information read instructions for reading information recorded on the recording medium 1 from the computer that serves as the host, the control section 5 complies with the instructions and instructs the head control section 3 to move the magnetic head to a position at which the information to be read is recorded. The head control section 3 controls the head assembly 2 to place the magnetic head over the information recording position on the recording medium 1. The magnetic head reads information from the information recording position and outputs the read information to the RW section 4. The RW section 4 decodes the information and outputs the decoded information to the control section 5. The control section 5 outputs the decoded information to the computer that serves as the host.

The operation performed by the control section 5 will now be described. The control section 5 forms concentric or spiral data tracks on the surface of the recording medium 1. In this instance, the control section 5 forms first and second bands, which are adjacent to each other. In a first band, an inner data track is partly overwritten by a neighboring outer data track. In a second band, an outer data track is partly overwritten by a neighboring inner data track. The subsequent explanation assumes that the data tracks are concentrically formed.

While assuming that the value N is an integer 2 or greater, and that the value k is an integer 0 or greater, the control section 5 divides the tracks on the recording medium 1 into sets of N tracks. Each set begins with the Nk+1th track and ends with the Nk+Nth track.

Figure 2:
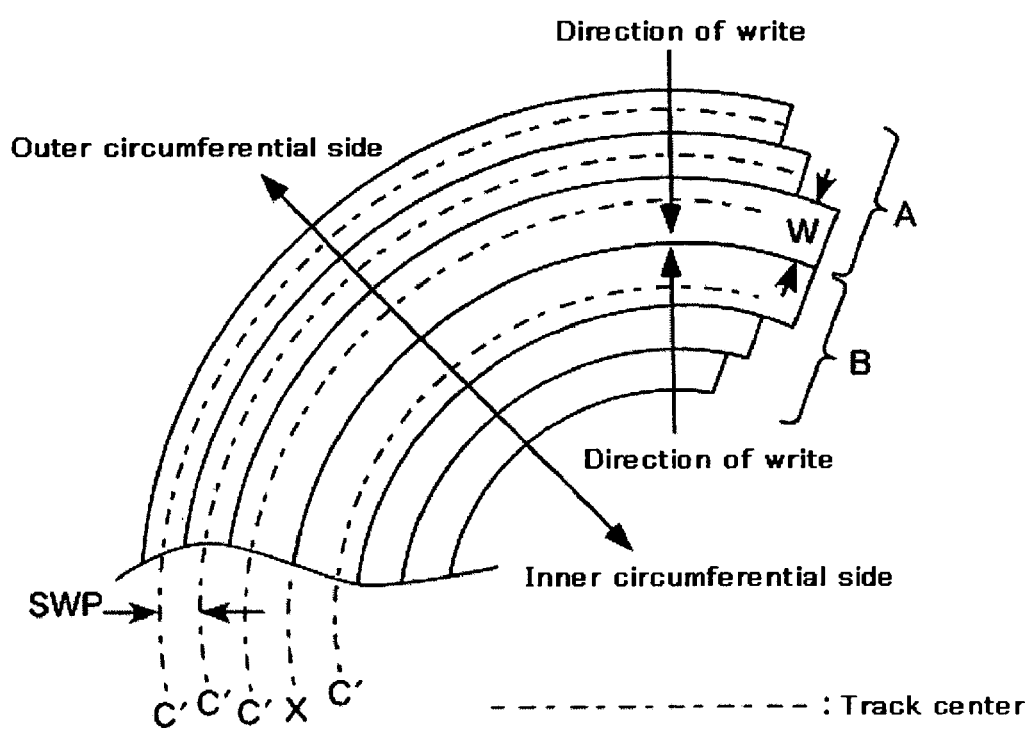
FIG. 2 illustrates data tracks that are formed on a recording medium of a disk drive according to one embodiment of the present invention.

For a set in which the value k is an odd number, the magnetic head position is controlled as indicated in FIG. 2 so that an inner data track is partly overwritten by a neighboring outer data track, and data is written via the RW section 4 to form the first band (A). For a set in which the value k is an even number, the magnetic head position is controlled so that an outer data track is partly overwritten by a neighboring inner data track, and data is written via the RW section 4 to form the second band (B). Applying the method of calibrating the magnetic head position, described later in detail, enables the intervals of the track center to be equal for different bands, which makes it easy to change the number of tracks in bands with flexibility.

The first band, in which an inner data track is partly overwritten by a neighboring outer data track, and the second band, in which an outer data track is partly overwritten by a neighboring inner data track, are now formed on the recording medium 1.

When the data tracks are formed as described above, the distance between the centers C' of the tracks, or the track pitch SWP, can be rendered smaller than the width W of a data track recorded by the magnetic head, as indicated in FIG. 2. At a location where the first and second bands are adjacent to each other, an unavailable track arises as indicated by the symbol X in FIG. 2. In the present embodiment, the number of unavailable tracks per 2N data tracks can be limited to one when N data tracks are contained in the first and second bands. Therefore, the storage capacity increase ratio can be enhanced. This is true in the case that the track pitch SWP decreases more than that shown in FIG. 2, and the number of unavailable tracks is more than two. Further, the unavailable tracks can be used as an index of the boundaries of bands.

Figure 3:
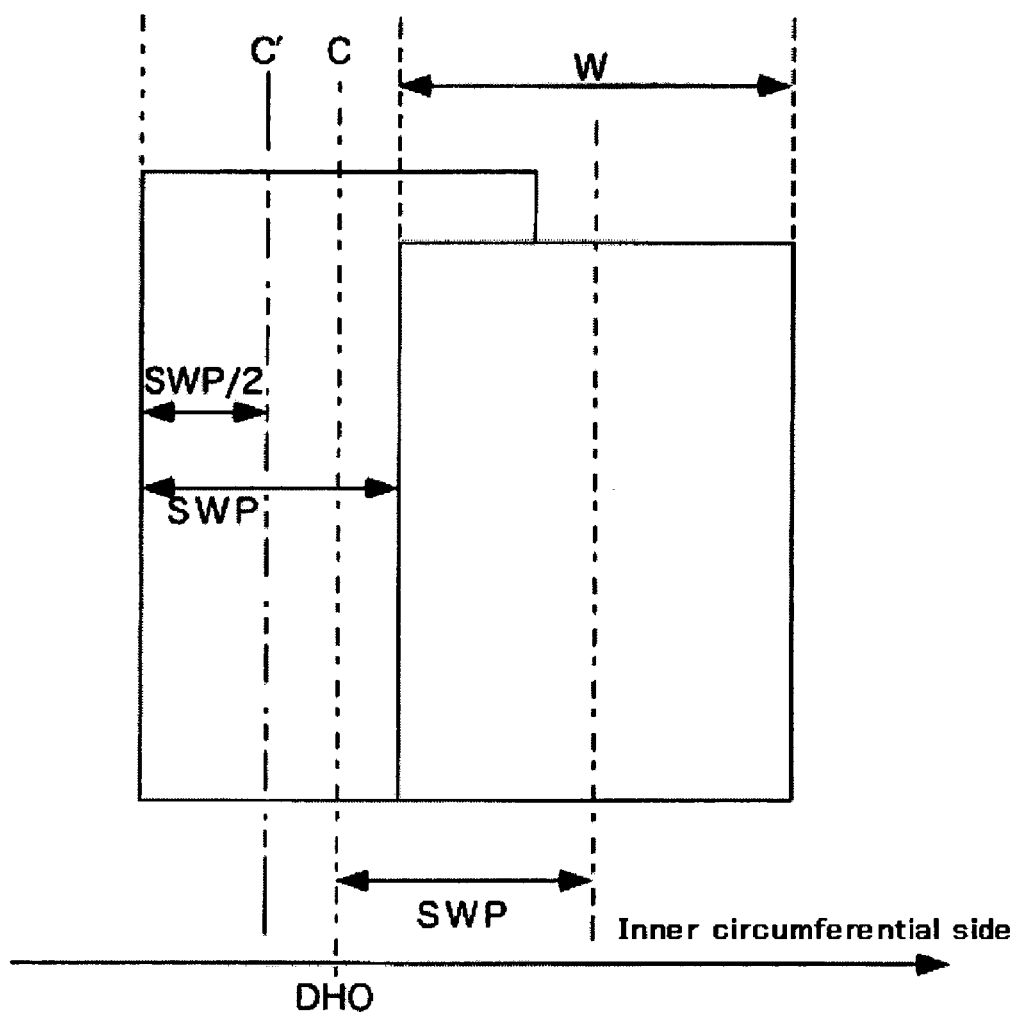
FIG. 3 illustrates a typical head position control operation that is performed by a disk drive according to one embodiment of the present invention.

In the present embodiment, the control section 5 needs to exercise control so that the center of the magnetic head is placed at position C' in FIG. 2 at the time of a read. For this purpose, the control section 5 must perform a process for calibrating the magnetic head position, previously. This calibration process will now be described with reference to FIG. 3. FIG. 3 is an enlarged schematic view of parts of data tracks in the first band. For ease of understanding, FIG. 3 schematically shows an overlap between data tracks. The inner data track may be an erased track.

If the control section 5 moves the center of the magnetic head to the position DHO of the magnetic head center C for an information write onto the data track to be read, as indicated in FIG. 3, the data in an overwritten neighboring data track becomes noise. At the time of a read, therefore, the control section 5 moves the magnetic head to a location that is shifted outward from the DHO by half the write width W, that is, by W/2, and then shifted inward by half the track pitch SWP, that is, by SWP/2 (DHO−W/2+SWP/2).

If the write width W is unknown, the offset from the magnetic head center position DHO for a write (ideally the value providing −W/2+SWP/2) is determined from an error rate that prevails during an actual read. In other words, the control section 5 tries to read information in each step while sequentially moving the magnetic head to the center position DHO in predetermined steps from, for instance, a position to which the magnetic head for a read is moved outward from the center position DHO by the track pitch SWP. As a result of such a trial, the data error rate is minimized at an ideal position. The position at which the error rate is minimized is therefore stored as the offset.

When reading a specified data track, the control section 5 moves the magnetic head to a position that is corrected by the stored offset in relation to the position DHO of the magnetic head center C for an information write onto the specified data track. The control section 5 then reads data from the data track, receives a data input from the RW section 4, and outputs the received data input to the host.

The DHO is defined with reference to the magnetic head position for a write (write element position). However, if the magnetic head position for a read (read element position) can be determined, for instance, from servo information, the DHO may be defined with reference to the read element position. In such an instance, the magnetic head position for a write is offset from the DHO, which is based on the read element position, to DHO+W/2−SWP/2.

Figure 4:
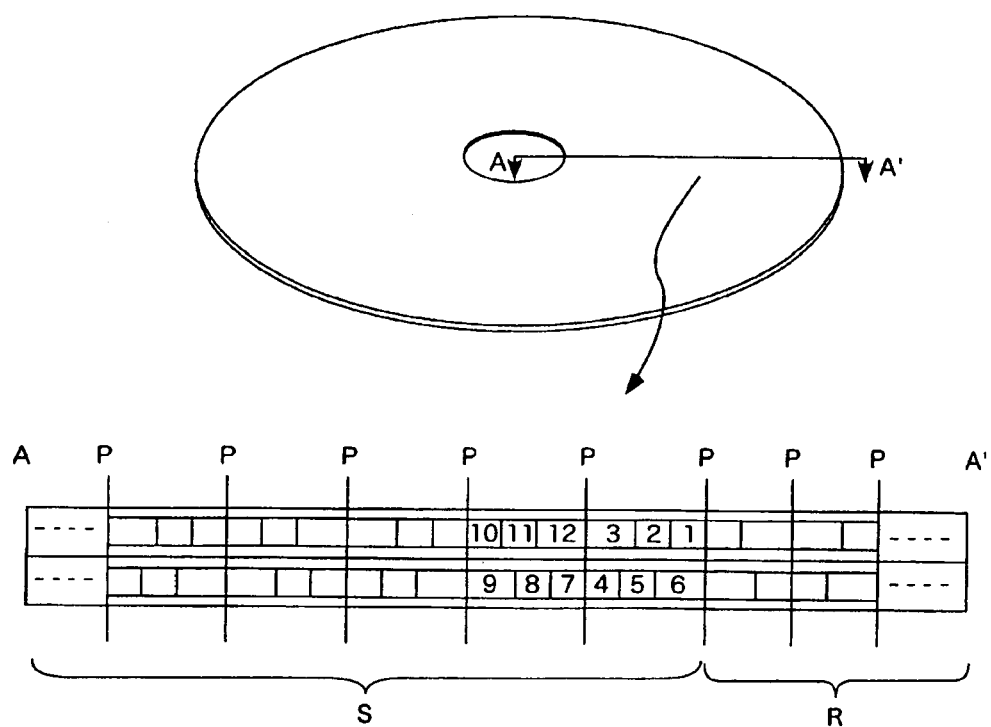
FIG. 4 illustrates data tracks that are formed on both surfaces of a recording medium of a disk drive according to one embodiment of the present invention.

When LBAs (logical block addresses) are to be assigned to the surfaces of the recording medium, the read/write surface changeover position is set to coincide with the first/second band changeover position (P) as indicated in FIG. 4. Further, the second band is formed on the back surface of the first band, and the first band is formed on the back surface of the second band. FIG. 4 is a schematic cross-sectional view of the recording medium that is taken along centerline A-A' to illustrate how the data tracks are formed.

In the A-A' cross-sectional view in FIG. 4, a wider rectangular area is the last-overwritten data track within the first or second band. A narrower rectangular area is a data track that is partly overwritten by another data track. The rectangular areas are numbered to indicate the order in which the data tracks are written.

When the data tracks are formed as described above, data are sequentially recorded, as indicated in FIG. 4, by writing data tracks 1, 2, and 3 beginning with the outer circumferential side, changing the magnetic medium surface, writing data tracks 4, 5, and 6 while moving the magnetic head in a different direction (toward the outer circumferential side), performing a seek to locate data track 7, and writing data tracks 7, 8, and 9 while moving the magnetic head toward the inner circumferential side. When the band changeover position P is reached, the magnetic medium surface is changed, and data is recorded (data tracks 10, 11, and 12) while moving the magnetic head in an opposite direction (toward the outer circumferential side). As is obvious from this example, there is no need to perform a seek when the magnetic medium surface is changed. As a result, the recording efficiency increases.

As indicated in FIG. 4, the outer and inner circumferential sides may differ in the number of data tracks contained in the bands. In the example shown in FIG. 4, two data tracks are contained in a band on the outer circumferential side, whereas three data tracks are contained in a band on the inner circumferential side.

When the data tracks are formed as described above, an area (R) in which a small number of data tracks are contained in a band may be selectively used as a random access data recording area, and an area (S) in which a large number of data tracks are contained in a band may be selectively used as a sequential access data recording area. In general, when the number of data tracks contained in a band decreases, the storage capacity increase ratio decreases, but the rewrite efficiency increases, thereby providing increased suitability for random access. It is preferred that the area boundary for providing data tracks whose number varies from one band to another be identified by the radial position of the recording medium. Further, it may be formed as two or more groups, in which the area (R) and area (S) are positioned adjacent to each other. For example, the user specifies the radial position prior to formatting.

Further, the control section 5 according to the present embodiment arranges data recording sectors for each band as indicated in FIG. 5 so that the LBA number is incremented by one in the radial direction of the recording medium 1, beginning with the data track to be written first and continuing until the last data track to be written is reached.

When the data for a plurality of sectors are received as write data from the host, the control section 5 divides the write data into groups of N write data in accordance with the number N of data tracks contained in a band that serves as the data write destination. In this instance, the data is rearranged in such a manner that the data in the i-th sector is contained in the (r+1)-th write data group, where the value r is the remainder obtained when the value i is divided by the value N. It is preferred that the value N is a power of 2 such as 2, 4, 8, 16, and so on, when the write data from the host is composed by a cluster (data unit contained a number of data sectors).

If, for instance, eight sectors of data are to be rewritten and two data tracks are contained in the write destination band, a first write data group, which comprises the data to be written in the 1st, 3rd, 5th, and 7th sectors, and a second write data group, which comprises the data to be written in the 2nd, 4th, 6th, and 8th sectors, are generated.

In accordance with the first write data group, the control section 5 writes four sectors of data (1st, 3rd, 5th, and 7th sectors) in the data track to be recorded first in a band (first data track) (step 1 in FIG. 6). In accordance with the second write data group, the control section 5 then writes four sectors of data (2nd, 4th, 6th, and 8th sectors) in the neighboring second data track while overwriting a part of the 1st, 3rd, 5th, and 7th sectors (step 2 in FIG. 6). Because of the above sector layout and data process, it is not necessary to buffer the data for the data tracks to be recorded later. In other words, it is not necessary to read the data that is already written in the data track to be recorded later. Therefore, the overhead for disk turns for read/write operations (N−1 turns maximum) can be avoided. As a result, write operations can be performed with high efficiency.

The above sector layout and data write method can also be applied to the conventional shingle write method in which the first and second bands are not differentiated from each other. In other words, when instructions for writing into a plurality of sectors are received, the data to be written into each sector is divided into groups of N write data, where the value N is the number of data track sets to be subjected to a shingle write, and then a write is performed in relation to N data tracks. However, the rewrite efficiency for the same recording density is lower than when the write direction is changed, for instance, for the first and second bands. To achieve the same recording density locally as in the examples shown in FIGS. 5 and 6, it is necessary to define groups of four data tracks that are to be subjected to a shingle write. When, in this instance, eight sectors of data are to be recorded as indicated in the above example, the data is divided into four write data groups so that the amount of time required for a write is equivalent to four disk turns.

As described above, the present embodiment makes it possible to enhance the storage capacity increase ratio while reducing the processing load for read/write operations. Further, when one of paired data tracks is unduly rewritten, the present embodiment prevents the remaining data track from being side-erased as a result of being interfered with by a write signal as is the case with the technology disclosed by Patent Document 1.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
    a recording medium that includes concentric or spiral data tracks, which are partly overwritten by an inner or outer neighboring data track, each of the data tracks being provided with a plurality of circumferentially arranged sectors; and
    a control section, which, upon receipt of instructions for writing into a plurality of sectors, rearranges the data to be written into each sector into groups of N pieces of write data as specified, and writes the data into N data tracks.

2. The disk drive according to claim 1, wherein the recording medium includes a first band in which an inner data track is partly overwritten by a neighboring outer data track and a second band in which an outer data track is partly overwritten by a neighboring inner data track.

3. The disk drive according to claim 2, wherein the first and second bands of the recording medium each contain N data tracks, where the value N is two or greater.

4. The disk drive according to claim 3, wherein a plurality of different areas are formed so that the first and second bands of the recording medium differ in the number of contained data tracks.

5. The disk drive according to 3, wherein the boundaries among the plurality of areas are specified by a user at the time of formatting.

6. The disk drive according to claim 2, wherein the control section sets the data to be written into an i-th sector of the first or second band as the data to be written into an r-th data track, where the value r is the remainder obtained when the value i is divided by the value N, and does the rearrangement.

7. The disk drive according to claim 6, wherein the value N is a power of 2.

8. The disk drive according to claim 2, wherein the first and second bands of the recording medium are positioned adjacent to each other.

9. A disk drive comprising:
a recording medium that includes concentric or spiral data tracks, which are partly overwritten by an inner or outer neighboring data track, each of the data tracks being provided with a plurality of circumferentially arranged sectors; and
means for, upon receipt of instructions for writing into a plurality of sectors, rearranging the data to be written into each sector into groups of N pieces of write data as specified, and writes the data into N data tracks.

10. The disk drive according to claim 9, wherein the recording medium includes a first band in which an inner data track is partly overwritten by a neighboring outer data track and a second band in which an outer data track is partly overwritten by a neighboring inner data track.

11. The disk drive according to claim 10, wherein the first and second bands of the recording medium each contain N data tracks, where the value N is two or greater.

12. The disk drive according to claim 11, wherein a plurality of different areas are formed so that the first and second bands of the recording medium differ in the number of contained data tracks.

13. The disk drive according to claim 12, wherein the boundaries among the plurality of areas are specified by a user at the time of formatting.

14. The disk drive according to claim 10, wherein the means sets the data to be written into an i-th sector of the first or second band as the data to be written into an r-th data track, where the value r is the remainder obtained when the value i is divided by the value N, and does the rearrangement.

15. The disk drive according to claim 14, wherein the value N is a power of 2.

16. The disk drive according to claim 10, wherein the first and second bands of the recording medium are positioned adjacent to each other.

* * * * *